Jan. 2, 1951        R. R. RANDALL        2,536,392
NONTORQUE EQUALIZING DIFFERENTIAL
Filed Aug. 23, 1947        2 Sheets-Sheet 1
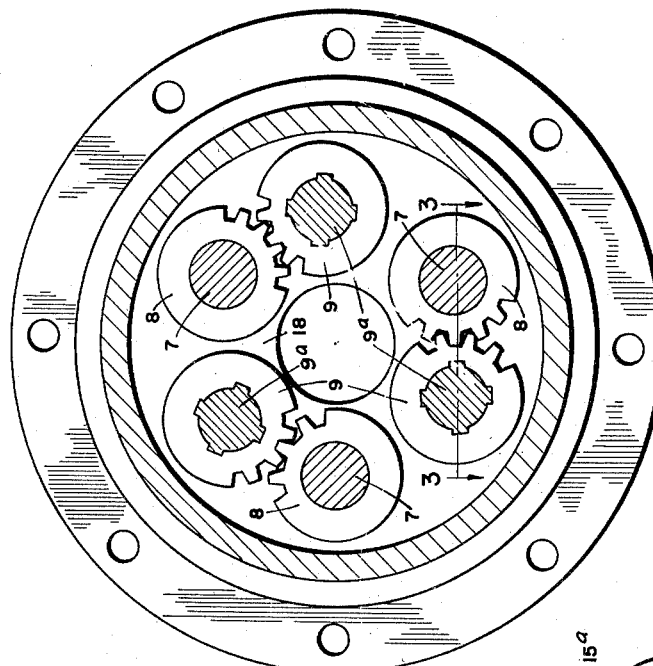
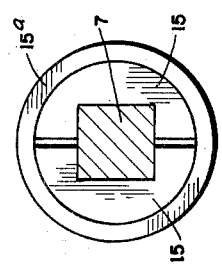
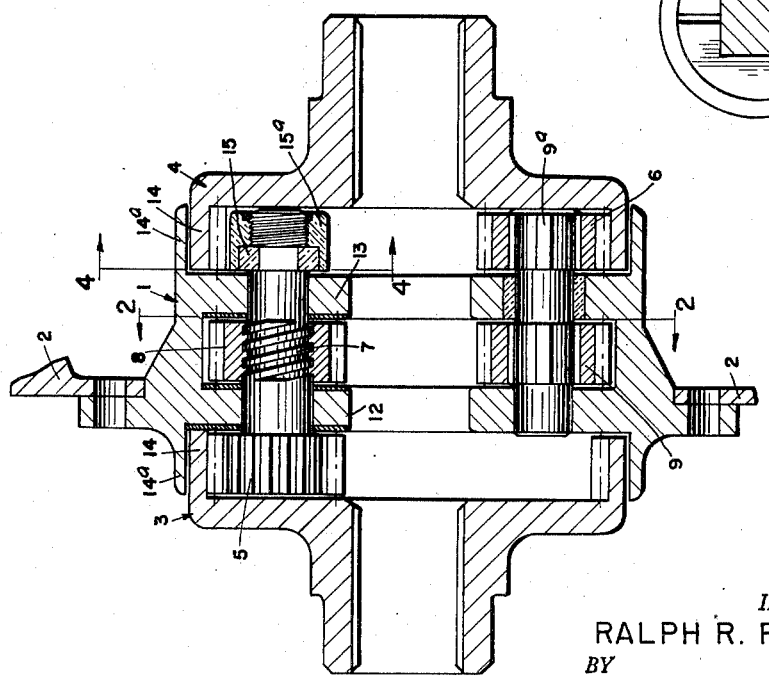
*INVENTOR.*
RALPH R. RANDALL
BY
ATT'YS.

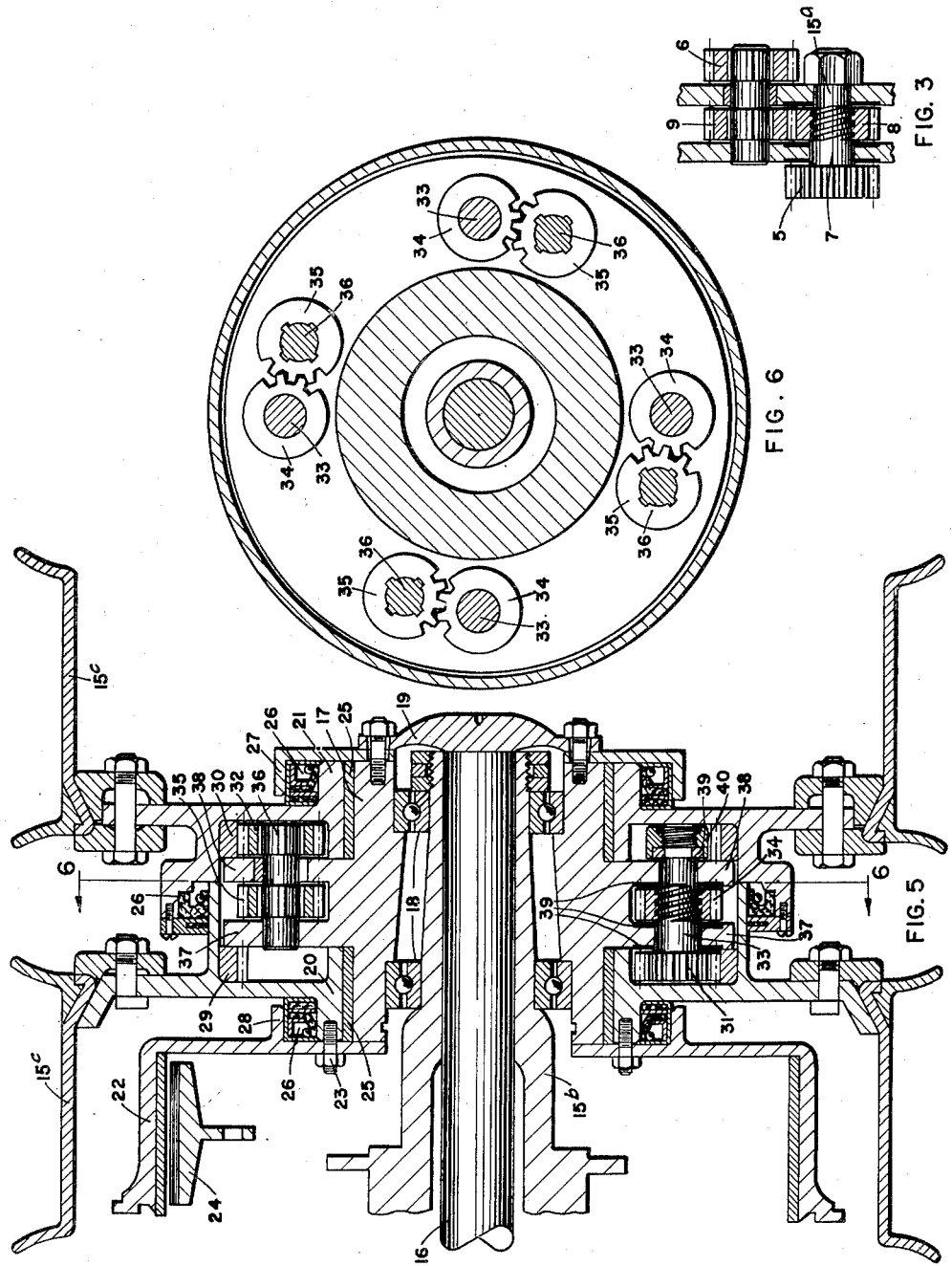

Patented Jan. 2, 1951

2,536,392

UNITED STATES PATENT OFFICE 2,536,392

NONTORQUE EQUALIZING DIFFERENTIAL

Ralph R. Randall, Freeport, Ill., assignor, by mesne assignments, to Dualoc Engineering Co., Rockford, Ill., a corporation of Illinois Application August 23, 1947, Serial No. 770,300

6 Claims. (Cl. 74—711)

My invention relates to non-torque-equalizing differential transmissions.

One of the objects of my invention is to provide an improved non-torque-equalizing differential involving the use of planetary nut gears and internal gears coaxial with the driven rollers.

A further object is to provide such a construction using simple spur gear transmission elements and simple screw threaded constructions for the locking action.

Further objects and advantages of the invention will be apparent from the description and claims.

In the drawings, in which two embodiments of my invention are shown,

Figure 1 is an axial cross section of a non-torque-equalizing differential;

Fig. 2 is a section substantially on the line 2—2 of Fig. 1;

Fig. 3 is a section substantially on the line 3—3 of Fig. 2;

Fig. 4 is a section on the line 4—4 of Fig. 1;

Fig. 5 is an axial sectional view of a dual wheel construction embodying my invention; and Fig. 6 is a section substantially on the line 6—6 of Fig. 5.

Referring to Figures 1 to 4 inclusive of the drawings in detail, the construction shown comprises a rotatable gear carrier 1 which may be driven through the bevel gear 2 from the propeller shaft of a motor vehicle, two internal spur gears 3 and 4 coaxial with the rotatable gear carrier 1 and rotatably mounted with respect thereto, to which the axles of the ground-engaging wheels may be splined, respectively, and the transmission between said gear carrier 1 and spur gears 3 and 4 comprising a plurality of pairs of spur gears, one gear 5 of each pair meshing with the axle gear 3 and the other gear 6 of each of said pairs meshing with the other axle gear 4, a plurality of externally threaded shafts 7 rotatable, respectively, with one of the spur gears 5, a plurality of internally threaded spur gears 8, one threaded on each shaft 7, a plurality of spur gears 9 splined on the shafts 9ª and meshing, respectively, with said internally threaded spur gears 8 and rotatable, respectively with the gears 6 also splined on the shafts 9ª, and means for limiting the threading movement of said threaded gears 8 on said threaded shafts 7 to lock the threaded gears and threaded shafts to the gear carrier 1.

The gear carrier 1 comprises a housing member having two inwardly extending flanges 12 and 13. The shafts 7 and 9ª are rotatably mounted in bearing openings in the flanges 12 and 13.

The flanges 14 of the axle gears may be rotatably centered by the flanges 14ª of the gear carrier 1.

The screw threaded shaft 7 with which the spur gear 5 is rotatable is held against axial movement in the flanges 12 and 13 by means of a split collar or washer 15 seated in a recess in the nut 15ª, screwed on the threaded shaft 7 which split collar is engageable with the flange 13 and an annular side shoulder on the spur gear 5 which is engageable with the other flange 12. One side face of the internally threaded gear 8 may engage the inner face of the flange 13 and the other side face of this gear may be brought into engagement with the inner face of the other flange 12. Either of these engagements will cause the spur gear 5 to be clamped against relative rotation with respect to the gear carrier 1.

In use, if one ground engaging wheel has traction and the other does not and power is being applied to turn the gear carrier 1, the threaded gears 8 will rotate slightly, due to the road resistance of the ground wheel which has traction until each of these internally threaded gears 8 has rotated sufficiently to cause it to clamp one or the other of the flanges 12 or 13 between either the shouldered collar 15 or the shouldered gear 5 to lock the internally threaded gear 8, the gears 9 and 6, the threaded shaft 7 and the gear 5 against further rotation with respect to the gear carrier. Further driving force of the gear carrier will be transmitted directly to the axle gear and axle of that wheel which has traction through one or the other of the locked spur gears 5 or 6, regardless of the fact that one of the ground-engaging wheels has no tractive effect.

When both ground wheels have tractive effect and the vehicle is travelling a straight course, power will be transmitted equally to both ground wheels. If the vehicle is going around a corner and one or the other of the ground-engaging wheels has to precess, the driving effort will be transmitted equally to the lagging wheel and to the precessing wheel which adjust themselves because of their engagement with the ground.

While I have described the gears as spur gears and have shown them in the drawings as non-helical gears, it is obvious that they might be made helical gears in order to lessen noise and vibration, so long as the drive between two meshing gears is reversible, and in the claims where the expression "spur gears" is used, it is to be understood as covering such helical gears.

I have found in practice that a 15 degree pitch angle or slope of the threads of the shaft 7 gives satisfactory results for certain types of transmission although this may vary depending on conditions, materials used, etc.

The construction shown in Figs. 5 and 6 may be for use with a dual wheel drive in which a pair of traction wheels are mounted on a bearing sleeve 15b extending laterally from the side of the vehicle. This bearing sleeve may carry either a pair of steerable wheels or a pair of nonsteerable wheels 15c. In either case, the wheels may be used either as nondrive wheels or as drive wheels and in both cases will be provided with a differential gearing between the two traction wheels.

The construction shown comprises the bearing sleeve 15b, the gear carrier 17 rotatably mounted thereon by means of antifriction bearings 18, the drive axle 16 extending through the bearing sleeve 15b and having a flange 19 secured to the gear carrier 17, the flanged hubs 20 and 21 on which the dual traction wheels 15c are mounted, differential gearing acting between the gear carrier 17 and the two hubs 20 and 21, and an internal brake drum 22 secured to the flanged hub 20 by means of stud bolts 23 and controlled by an internal expanding brake 24. Suitable bearing bushings 25 may be provided between the gear carrier 17 and the hubs 20 and 21 of the traction wheels. Suitable oil seals 26 may be provided, one between the two hubs 20 and 21, another between the hub 21 and the flanged collar 27 secured to the gear carrier 17, and another between the hub 20 and a flange 28 on the brake drum.

The non-equalizing-torque transmission between the gear carrier 17 and the two traction wheel hubs 20 and 21 comprises two internal spur gears 29 and 30 coaxial with the rotatable gear carrier 17 and mounted on the flanges of the hubs 20 and 21, respectively, and the transmission between said gear carrier 17 and internal spur gears 29 and 30 comprising a plurality of pairs of spur gears, one gear 31 of each pair meshing with the internal gear 29 and the other gear 32 of each of said pairs meshing with the other internal gear 30, a plurality of externally threaded shafts 33 rotatable, respectively, with one of the spur gears 31, a plurality of internally threaded spur gears 34, one threaded on each shaft 33, a plurality of spur gears 35 splined on the shafts 36 and meshing, respectively, with said internally threaded spur gears 34 and rotatable, respectively, with the gears 32, also splined on the shafts 36, and means for limiting the threading movement of said threaded gears 34 on said threaded shafts 33 to lock the threaded gears and threaded shaft to the gear carrier 17.

The gear carrier 17 comprises a hub member having two radially extending flanges 37 and 38. The shafts 33 and 36 are rotatably mounted in bearing openings in the flanges 37 and 36.

The screw threaded shaft 33 with which the spur gear 31 is rotatable is held against axial movement in the flanges 37 and 38 by means of a split collar or washer 39 seated in a cylindrical recess in the nut 40, screwed on the threaded shaft 33 which split collar is engageable with the flange 38 and an annular side shoulder on the spur gear 31 which is engageable with the other flange 37. One side face of the internally threaded gear 34 may engage the inner face of the flange 38 and the other side face of this gear may be brought into engagement with the inner face of the other flange 37. Suitable bearing rings 39a may be provided for the engaging faces. Either of these engagements will cause the spur gear 5 to be clamped against relative rotation with respect to the gear carrier 1.

In use, if one ground engaging wheel has traction and the other does not and power is being applied to turn the gear carrier 17, the threaded gears 34 will rotate slightly, due to the road resistance of the ground wheel which has traction until each of these internally threaded gears 34 has rotated sufficiently to cause it to clamp one or the other of the flanges 37 or 38 between either the shouldered collar 39 or the shouldered gear 31 to lock the internally threaded gear 34, the gears 35 and 32, the threaded shaft 33 and the gear 31 against further rotation with respect to the gear carrier 17. Further driving force of the gear carrier will be transmitted directly to the ring gear 29 or 30 of that wheel which has traction through one or the other of the locked spur gears 31 or 32, regardless of the fact that one of the ground-engaging wheels has no tractive effect.

When both ground wheels have tractive effect and the vehicle is travelling in a straight course, power will be transmitted equally to both ground wheels. If the vehicle is going around a corner and one or the other of the ground-engaging wheels has to precess, the driving effort will be transmitted equally to the lagging wheel and to the precessing wheel which adjust themselves because of their engagement with the ground.

Further modifications will be apparent to those skilled in the art and it is desired, therefore, that the invention be limited only by the scope of the appended claims.

Having thus described my invention, what I claim and desire to secure by Letters Patent is:

1. A non-equalizing-torque differential comprising a rotatable gear carrier, two rotatably driven elements coaxial with said gear carrier and a transmission between said gear carrier and said driven elements comprising a pair of internal spur gear elements rotatable with said driven elements, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally-threaded gear element on said threaded shaft acting to bind said threaded gear element and threaded shaft to said gear carrier comprising an abutment on said gear carrier engaged by said gear element in its threading movement.

2. A non-equalizing-torque differential comprising a rotatable gear carrier, two rotatably driven elements coaxial with said gear carrier and a transmission between said gear carrier and driven elements comprising a pair of internal spur gear elements rotatable with said driven elements, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally threaded gear element on said threaded shaft acting to bind said threaded gear element and threaded shaft to said gear carrier comprising a pair of abutments on said gear carrier on opposite sides of said gear element engaged by said gear element in its threading movement.

3. A non-equalizing-torque differential comprising a rotatable gear carrier, two rotatably driven elements coaxial with said gear carrier and a transmission between said gear carrier and driven elements comprising a pair of internal gear elements rotatable with said driven elements, respectively, a second pair of gear elements in force-transmitting relation to said first pair of gear elements, respectively, an externally screw-threaded shaft rotatable with one of said second pair of gear elements, an internally threaded gear element having threading movement on said shaft, a gear element meshing with said internally-threaded gear element and rotatable with the other one of said second pair of gear elements, and means for limiting the threading movement of said internally threaded gear element on said threaded shaft acting to bind said threaded gear element and threaded shaft to said gear carrier.

4. A transmission comprising a spur gear element, an externally screw threaded shaft rotatable with said spur gear element, an internally threaded spur gear element having a threading movement on said shaft and means for limiting the threading movement of said internally threaded gear element on said threaded shaft comprising a two-part radially split thrust collar embracing said shaft and a nut threaded on said shaft surrounding said two-part collar to hold the parts together and engaged by said collar to hold it against threading movement.

5. A transmission comprising a spur gear element, an externally screw threaded shaft rotatable with said spur gear element, an internally threaded spur gear element having a threading movement on said shaft and means for limiting the threading movement of said internally threaded gear element on said threaded shaft comprising a two-part radially split thrust collar embracing said shaft and a nut threaded on said shaft surrounding said two-part collar to hold the parts together and engaged by said collar to hold it against threading movement, said shaft having a reduced neck portion to provide spaced shoulder portions between which the thrust collar is held.

6. A dual wheel differential gear construction comprising a bearing sleeve, a gear carrier rotatably mounted thereon, a pair of road-engaging wheels rotatably mounted on said gear carrier, a non-torque equalizing transmission acting between said gear carrier and wheels comprising a pair of internal spur gear elements rotatable with said wheels, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally-threaded gear element on said threaded shaft acting to bind said threaded gear element and threaded shaft to said gear carrier comprising an abutment engaged by said gear element in its threading movement.

RALPH R. RANDALL.

REFERENCES CITED

The following references are of record in the file of this patent:

UNITED STATES PATENTS

| Number | Name | Date |
|---|---|---|
| 1,397,066 | Williams | Nov. 15, 1921 |
| 1,406,627 | Elbertz | Feb. 14, 1922 |
| 1,431,535 | McDonald | Oct. 10, 1922 |
| 1,462,716 | Masin | July 24, 1923 |
| 1,596,517 | Dutreux | Aug. 17, 1926 |
| 2,000,223 | Du Pras | May 7, 1935 |
| 2,267,362 | Ash | Dec. 23, 1941 |
| 2,338,413 | Falco | Jan. 4, 1944 |
| 2,355,133 | Ash | Aug. 8, 1944 |